United States Patent [19]

Garofalo

[11] 4,120,604

[45] Oct. 17, 1978

[54] PORTABLE PNEUMATIC NUT RUNNING TOOL HAVING AIR SHUT-OFF CONTROLS

[76] Inventor: Nicholas J. Garofalo, 259-09 81st Ave., Floral Park, N.Y. 11004

[21] Appl. No.: 792,147

[22] Filed: Apr. 29, 1977

[51] Int. Cl.[2] ........................ F01B 25/00; B23B 45/04

[52] U.S. Cl. .................................. 415/25; 81/52.4 R; 173/12; 192/54

[58] Field of Search ............................ 415/25; 173/12; 81/52.4 R; 192/54

[56] References Cited

U.S. PATENT DOCUMENTS

| | | | |
|---|---|---|---|
| 2,246,910 | 6/1941 | Amtsberg | 173/12 |
| 3,608,647 | 9/1971 | Borries | 173/12 |
| 3,785,442 | 1/1974 | Amtsberg | 173/12 |
| 3,791,458 | 2/1974 | Wallace | 173/12 |
| 3,821,991 | 7/1974 | Alexander | 173/12 |
| 3,904,305 | 9/1975 | Boyd | 415/25 |
| 3,970,151 | 7/1976 | Workman, Jr. | 173/12 |
| 3,987,692 | 10/1976 | Lesner et al. | 81/57.13 |

*Primary Examiner*—C. J. Husar
*Attorney, Agent, or Firm*—Nicholas J. Garofalo

[57] ABSTRACT

A hand held pneumatic nut running tool including an air vane rotary motor, manipulative valving for initially starting air flow to the motor and then terminating such flow, and an air flow shut-off control valve responsive to acceleration of the motor after start-up and before said termination of air flow to continue air flow to the motor, the control valve being further responsive to a predetermined level of deceleration of the motor to discontinue air flow to the motor.

10 Claims, 2 Drawing Figures

PORTABLE PNEUMATIC NUT RUNNING TOOL HAVING AIR SHUT-OFF CONTROLS

BACKGROUND OF THE INVENTION

This invention is directed to improvements in automatically operating air shut-off controls for hand tools, such as nut runners, equipped with air driven vane motors.

It is particularly concerned with shut-off controls of a type in which centrifugal forces developed by the motor are utilized in their operation. The general purpose of such controls is to cause flow of operating air to the motor to be automatically discontinued as the nut being run down reaches a predetermined torqued condition.

Tools of this general purpose and nature are known from U.S. Pat. Nos. 3,791,458; 3,785,442; and 3,904,305. The arrangements in these tools employ air transmitting control valves to which application of precise differential air pressures is required for their proper functioning in the system to effect the desired shut-off of operating air to the motor.

The mode of operation of these known shut-off controls, together with their particular arrangement of cooperating components is complex, and the structures are involved.

Further, these known controls include a centrifugally operable control device supported at one end to the rotor shaft, but lacking support at the opposite end. Because of this mode of support, the high speed to which the control device is subjected may result in undesirable vibratory action.

Accordingly, a general object of the present invention is to improve over these known tools. It is intended to provide an air shut-off control arrangement for such tools which is not complex or involved in the organization and mode of cooperation of its components; which is simple in the mode of operation of its valve elements; and in which a centrifugally operable control mechanism is adequately supported at both ends so as to avoid undesirable vibration.

In accordance with the invention there is provided a portable pneumatic nut running tool comprising an air driven torque transmitting motor, a primary and a secondary air feed passage connecting with the motor, a throttle valve operable from a closed normal position to an open condition to feed operating air to both the primary and secondary passages, a shiftable control valve normally blocking the secondary passage to flow of operating air to the motor, centrifugally operable means responsive to acceleration of the motor to shift the control valve to open the secondary passage to flow of operating air to the motor, a blocking valve movable from an open normal position to a position blocking the primary passage to flow of operating air to the motor, manipulative lever means movable through an initial angle to open the throttle valve and movable through a further angle to move the blocking valve to its position blocking the primary passage, spring means responsive to a predetermined degree of deceleration of the motor to return the control valve to its position blocking the secondary passage, and return spring means responsive to manual release of the lever means to return the throttle and blocking valves to normal.

DETAILED DESCRIPTION OF THE INVENTION

Figure 1:
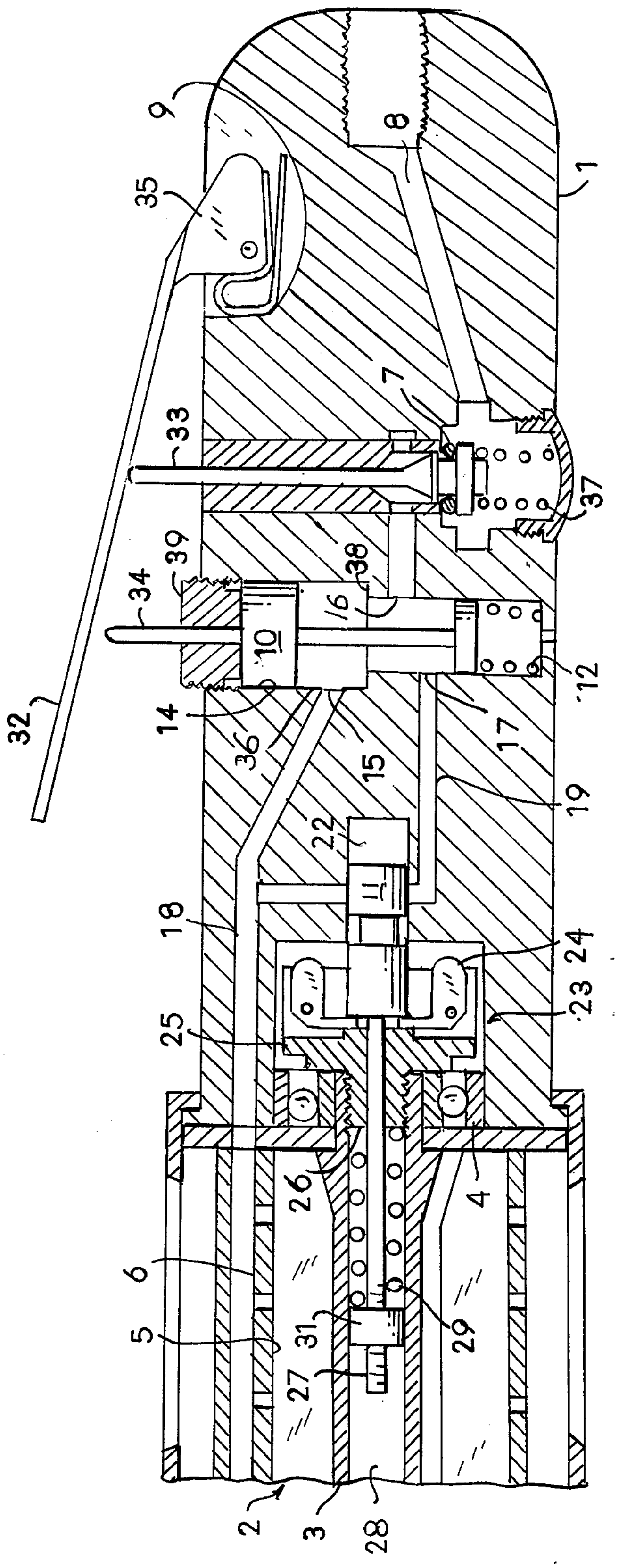
FIG. 1 is a longitudinal section of a portable pneumatic nut runner embodying the invention, only so much of the nut runner being shown as needed to understand the invention.

Reference is now directed to FIG. 1 of the drawing where the tool embodying a first form of the invention is illustrated. The tool has a general housing 1 within which is a conventional air driven rotary stall torque motor 2 of the slidable vane type. The motor includes a rotor member 3, which is supported at the ends of its shaft by means of bearings 4 (one being shown) for rotation in a chamber 5. The chamber is defined by a surrounding liner 6.

Rotation of the rotor is transmitted through the usual gearing and spindle (not shown) to a nut running socket at the front end of the tool to torque a threaded fastener, such as a nut or bolt head received in the socket.

A throttle valve 7 connected in an inlet passage 8 in a handle portion 9 of the housing controls flow of supply operating air into the tool. The throttle valve, as indicated, has a closed normal position.

Located in the housing between the throttle valve and the motor is an air shut-off control arrangement. This includes a blocking valve 10; a centrifugally operable shut-off valve 11; and air flow passages interconnecting these with the throttle valve and the motor.

The blocking valve is a slidable spool that is shiftable against the bias of a return spring 12 in a chamber 14 relative to a first outlet port 15. An inlet port 16 to the chamber and a second outlet port 17 are not affected by shifting of the blocking valve.

In the open normal position of the blocking valve, as indicated, supply air fed from the throttle valve through the inlet port 16 to the chamber 14 of the blocking valve passes around the neck of the latter to the open outlet ports 15 and 17. The air passing to the first outlet port 15 flows through a primary passage 18 to the rotor chamber 5 to impart an initial driving action to the rotor; while the air passing at this time to the second outlet port 17 flows into a secondary passage 19, but is blocked from reaching the rotor by means of a closed normal condition of the shut-off valve 11. However, the air entering the secondary passage is ready at the shut-off valve for immediate application to the rotor as soon as the shut-off valve is caused to open.

The blocking valve has a shifted position against the bias of its return spring in which position it covers over and blocks the first outlet port 15. This shifted condition of the blocking valve does not interrupt communication of the inlet port 16 with the second outlet port 17.

The shut-off valve is slidable in a guide chamber 22 from its closed normal position to an open position in which a neck area or groove around the valve functions to communicate the secondary passage with the primary passage so as to allow air flow from the throttle valve to the rotor.

The shut-off valve is adapted to be shifted from its closed to its open position, or returned to its closed position by means of a centrifugally controlled mechanism 23. This mechanism includes a pair of centrifugally movable flyweights 24 pivotally mounted in a supporting body 25. The latter has an axially extending stud 26 thresdedly supported and secured in an end of the rotor shaft for rotation as a unit with the rotor.

The shut-off valve is cylindrical in form. It has an elongate stem or rod 27 extending axially from its rear. The rod passes slidably through the body element 25 and projects into an axial bore 28 formed in the rotor shaft. A return spring 29, under compression between an end of stud 26 and an adjustable nut 31 on the rod, biases the shut-off valve to its closed normal position in which it is seated and tensioned against the arms of the flyweights. At all times the free end of the shut-off valve extends into the guide chamber 22 in bearing relation to the surrounding wall of the latter.

Rotation of the rotor carries the body element 25 around with it together with the flyweights and the shut-off valve. The support provided to the shut-off valve by the guide chamber 22 and body element 25, together with the slidable relation of the nut 31 in the bore of the rotor serve to prevent undesirable vibratory action in the valve as it is carried about by the rotor.

It can be seen that as the flyweights are centrifugally pivoted outwardly in response to a predetermined degree of acceleration of the rotor, their arm portions will slide the shut-off valve sufficiently into the guide chamber to register its neck area with the secondary passage 19. Air admitted by the throttle valve to the secondary passage will then flow through the open shut-off valve and primary passage 18 to the rotor.

To ensure easy sliding of the shut-off valve in the guide chamber, any air that may manage to leak around the valve to the rear of the chamber will be vented to the outside of the tool by means of a suitable vent, not shown.

It can also be seen that as the speed of the rotor subsides to a predetermined degree spring 29 will respond to return the shut-off valve to its closed condition. The nut 31 is adjustable as needed to vary the tension of the return spring and, as a consequence, the response action of the flyweights.

The throttle and blocking valves are arranged in the housing of the tool so as to be operable by means of a common manipulative lever 32. To this end, the blocking valve is positioned forwardly of and in alignment with the throttle valve, their vertical axes lying in the same plane. Each valve has an externally projecting actuating stem 33/34 with which the lever is cooperable in effecting shifting of the valves.

The lever is pivoted at its base end 35 to the housing for angular movement relative to the valve stems. In a normal or at rest position of the lever it rests upon the top of stem 33 of the throttle valve; and is spaced above and clear of the top of stem 34 of the blocking valve.

The extent of the external projection of both stems of the valves is such that, when the lever is pivoted inwardly toward the housing of the tool it wll first depress the throttle valve a predetermined distance to open condition before actuating the blocking valve; and upon further pivoting of the lever it will cooperate with both stems to actuate both valves. In this latter action the open condition of the throttle valve is continued, while the blocking valve is shifted to block or close off the first outlet port 15 from the inlet port 16.

A shoulder or stop 38 is cooperable with the blocking valve to avoid the valve being moved beyond its closed condition relative to the first outlet port 15.

In summary of the operation of the tool as improved by the present invention: after engaging the drive end of the tool with the threaded fastener to be torqued, such as a nut or bolt head, the operator depresses lever 32. The initial movement of the lever opens the throttle valve 7, causing application of operating air to the motor through port 15 and over the primary passage 18; and causing flow of operating air into the secondary passage 19 presently blocked by the shut-off valve 11.

The motor rapidly accelerates in response to the air being applied to it. As the operator continues the angular depression of the lever, the throttle valve is further actuated but without interrupting its open condition; and the blocking valve is progressively shifted to close the first outlet port 15 to the air inlet port 16. Before the blocking valve will have closed off port 15 the rapidly rotating motor will have accelerated sufficiently to cause the flyweights to slide the shut-off valve to its open condition. Supply air then flows from the secondary passage through the shut-off valve and connecting primary passage to continue the operation of the motor.

The rotation of the motor is transmitted to the drive end of the tool to run down and torque the work. When the work is tightened to a predetermined degree of torque that will load the motor sufficiently to reduce its centrifugal force to a value less than the resisting force of the return spring 29, the latter responds to return the shut-off valve to its closed normal position.

Upon the occurence of the latter event supply air flow to the motor will have been completely interrupted or shut-off. It will have been blocked from flowing to the motor by both the actuated condition of the blocking valve and the closed condition of the shut-off valve.

Upon manual release of the lever, the blocking and throttle valves will be restored to normal by their respective return springs 12 and 37.

It is to be noted that the blocking valve is disposed in its chamber so that in its unactuated position it is spaced a predetermined short distance 36 away from the first outlet port 15. This arrangement requires the valve to be moved over this initial space or lost motion distance and against the resistance of its spring before beginning to close over port 15. This mode of operation is of advantage in that it serves as a timer in the closing of the blocking valve and in the operation of the motor before such closing. It in effect allows a desired brief time lapse after the opening of the throttle valve and before the closing of the blocking valve port 15 to ensure sufficient acceleration of the motor to cause opening of the shut-off valve before closing of the blocking valve.

Means is provided for selectively varying the spacing 38 of the blocking valve relative to port 15. To this end, an annular screw 39, threaded in the upper end of the blocking valve chamber against the top end of the blocking valve, is adjustable as needed inwardly or outwardly to obtain the desired spacing.

The time delay arrangement for the movement of the blocking valve is of further advantage in that it enables a smooth follow-through manipulative movement of the operator in actuating the lever 32.

Figure 2:
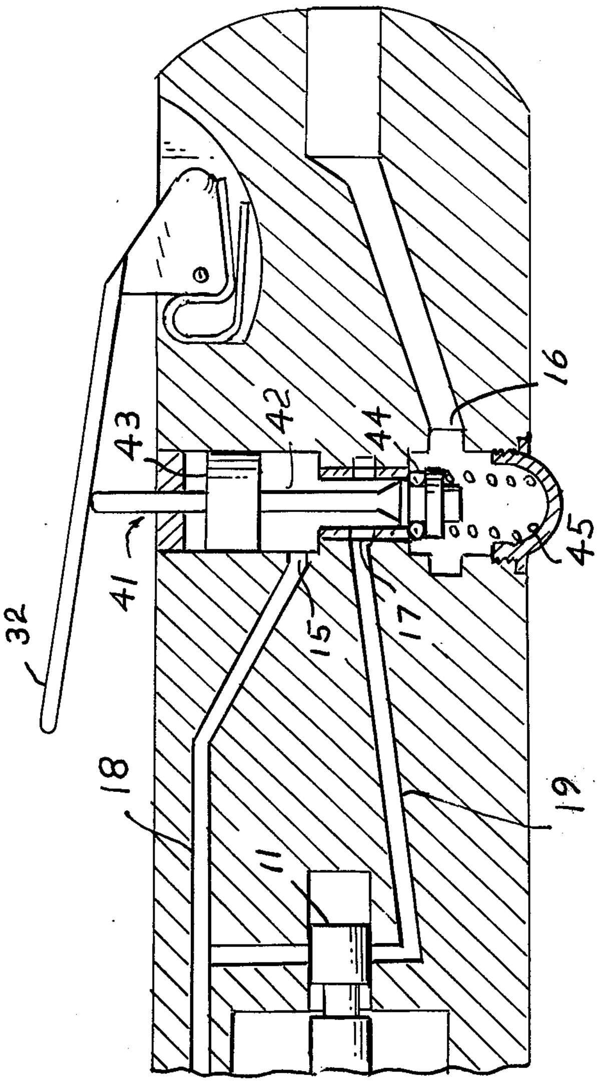
FIG. 2 is a view similar to that of FIG. 1 but illustrating a modified form of the invention.

The embodiment illustrated in FIG. 2 differs from that of FIG. 1 in that the functions performed by the individual throttle and blocking valves of FIG. 1 are now performed by a combined throttle and blocking valve member 41.

The combined valve member 41 includes a supporting stem or body 42, the upper end of which carries a land 43 defining a blocking valve; and the lower end of which carries an o-ring 44 defining a throttle valve.

The valve member has a normal position, as indicated, under the bias of a return spring 45 in which the blocking valve 43 is open or clear of the first outlet port 15; and the throttle valve 44 is seated closing off communication of the air supply inlet port 16 from the first and second outlet ports 15 and 17.

It can be seen that when the lever 32 is angularly moved an initial distance, the throttle valve 44 will open allowing flow of inlet air into the primary and secondary passages 18 and 19. As in the FIG. 1 embodiment, the air entering the primary passage will cause the motor to operate, while the air in the secondary passage 19 will be blocked by the closed condition of the shut-off valve 11. As the motor accelerates, the shut-off valve is caused to be centrifugally opened to the secondary passage.

As the lever is further moved, the blocking valve 43 closes port 15, while the throttle valve 44 continues its open condition.

As occurs in the FIG. 1 embodiment, as the motor decelerates to a predetermined level, the shut-off valve is caused to re-close, resulting in a complete shut-off of air flow to the motor. Subsequent relaease of the lever 32 allows the return spring 45 to return the valve member 41 to normal.

While an embodiment of the invention and a modification thereof have been illustrated and described in detail, it is to be expressly understood that the invention is not limited thereto. Various changes of form, design or arrangement may be made in its parts without departing from the spirit and scope of the invention. It is my intent, therefore, to claim the invention not only as shown and described but also in all such forms, modifications or equivalents thereof as might reasonably be construed to be within the spirit of the invention when considerred in the light of the specification, the drawings, and the appended claims.

What is claimed is:

1. A portable pneumatic nut running tool comprising an air driven torque transmitting motor, a primary and a secondary air feed passage connecting with the motor, a throttle valve operable from a closed normal position to an open position to feed operating air to both the primary and secondary passages, a shiftable control valve normally blocking the secondary passage to flow of operating air to the motor, centrifugally operable means responsive to acceleration of the motor to shift the control valve to open the secondary passage to flow of operating air to the motor, a blocking valve movable from an open normal position to a position blocking the primary passage to flow of operating air to the motor, manipulative lever means movable through an initial angle to open the throttle valve and movable through a further angle to move the blocking valve to its position blocking the primary passage, spring means responsive to a predetermined degree of deceleration of the motor to return the control valve to its position blocking the secondary passage, and return spring means responsive to manual release of the lever means to return the throttle and blocking valves to normal.

2. A portable pneumatic nut running tool as in claim 1, wherein means is provided for selectively adjusting from the outside of the tool the distance required of the blocking valve to move from its normal open position to its blocking position relative to the primary passage.

3. A portable pneumatic nut running tool as in claim 1, wherein timing means is provided for subjecting the blocking valve to a period of lost motion in passing from its open normal position to its blocking position relative to the primary passage.

4. A portable pneumatic nut running tool as in claim 1, wherein the blocking valve and the throttle valve are carried by a common supporting body, and the body is movable in a chamber relative to the primary and secondary passages and to a supply inlet.

5. A portable pneumatic nut running tool comprising an air vane rotary motor for transmitting torque to a threader fastener; a throttle valve for feeding operating air to the motor; a blocking valve shiftable in a chamber located between the throttle valve and the motor; and air inlet port to the chamber communicating with the throttle valve; the throttle valve having a closed normal position blocking flow of operating air through the inlet port to the chamber; a primary passage communicating a first outlet port from the chamber with the motor; a secondary passage connecting a second outlet port from the chamber with the primary passage; the blocking valve having a normal position in the chamber clear of the first outlet port and the second outlet port in which position the inlet port is in communication with both the first and second outlet ports; the blocking valve having a shifted position in which it blocks off only the first outlet port from the inlet port; a shiftable control valve having a closed normal position blocking communication of the secondary passage with the primary passage; a return spring biasing the control valve to its normal position; the control valve having a shifted position communicating the secondary passage with the primary passage; centrifugally operable means carried by the motor and abutting the control valve having response to a predetermined degree of acceleration of the motor to shift the control valve to its shifted condition: the return spring having response to a predetermined degree of deceleration of the motor to return the control valve to its normal position; a manipulative valve actuating lever common to both the throttle valve and the blocking valve; the lever being movable through an initial angle to actuate the throttle valve to open condition, and being movable through a further angle to shift the blocking valve to its shifted condition blocking the first outlet port; and spring means responsive to manual relaease of the lever to return the blocking and throttle valves to their normal positions.

6. A portable pneumatic nut running tool as in claim 5, wherein means is provided for selectively adjusting from the outside of the tool the normal position of the blocking valve relative to the first outlet port.

7. A portable pneumatic nut running tool as in claim 6, wherein the adjusting means is a screw plug threaded in an open end of the chamber in abutting relation to an end of the blocking valve.

8. A portable pneumatic nut running tool as in claim 5, wherein the control valve is shiftable in a guide chamber intersecting the secondary passage, and the control valve has an annular neck area registrable with the secondary passage upon being shifted from its closed normal position.

9. A portable pneumatic running tool as in claim 8, wherein the control valve is supported at one end for rotation as a unit with the motor, and has at an opposite end a bearing support with the wall of the guide chamber.

10. A portable pneumatic nut running tool as in claim 5, wherein the centrifugally operable means is a pair of flyweights abutting an end of the control valve and pivotally mounted in a support carried by the motor.

* * * * *